United States Patent [19]
Truax

[11] 3,861,039
[45] Jan. 21, 1975

[54] ELECTRIC KNIFE
[76] Inventor: Earl S. Truax, 1863 S. 90th St., Omaha, Nebr. 68124
[22] Filed: Dec. 3, 1973
[21] Appl. No.: 421,098

[52] U.S. Cl. .............................................. 30/272 A
[51] Int. Cl. .............................................. B26b 7/00
[58] Field of Search ....................... 30/272 A, 272 R

[56] References Cited
UNITED STATES PATENTS
| | | | |
|---|---|---|---|
| 3,153,852 | 10/1964 | Freeman | 30/272 A |
| 3,189,998 | 6/1965 | Beisheim et al. | 30/272 A |
| 3,303,563 | 2/1967 | Peterson | 30/272 A |

Primary Examiner—Al Lawrence Smith
Assistant Examiner—J. T. Zatarga
Attorney, Agent, or Firm—Marden S. Gordon

[57] ABSTRACT

An electric knife having a motorized drive unit contained in a housing and adapted to detachably receive a pair of juxtapositioned cutting blades in a manner disposed horizontally or at a diagonal angle to the housing, the motor including a reciprocating drive unit which is operatively associated with the knife blades for reciprocating such blades relative to each other to accomplish a cutting action.

1 Claim, 8 Drawing Figures

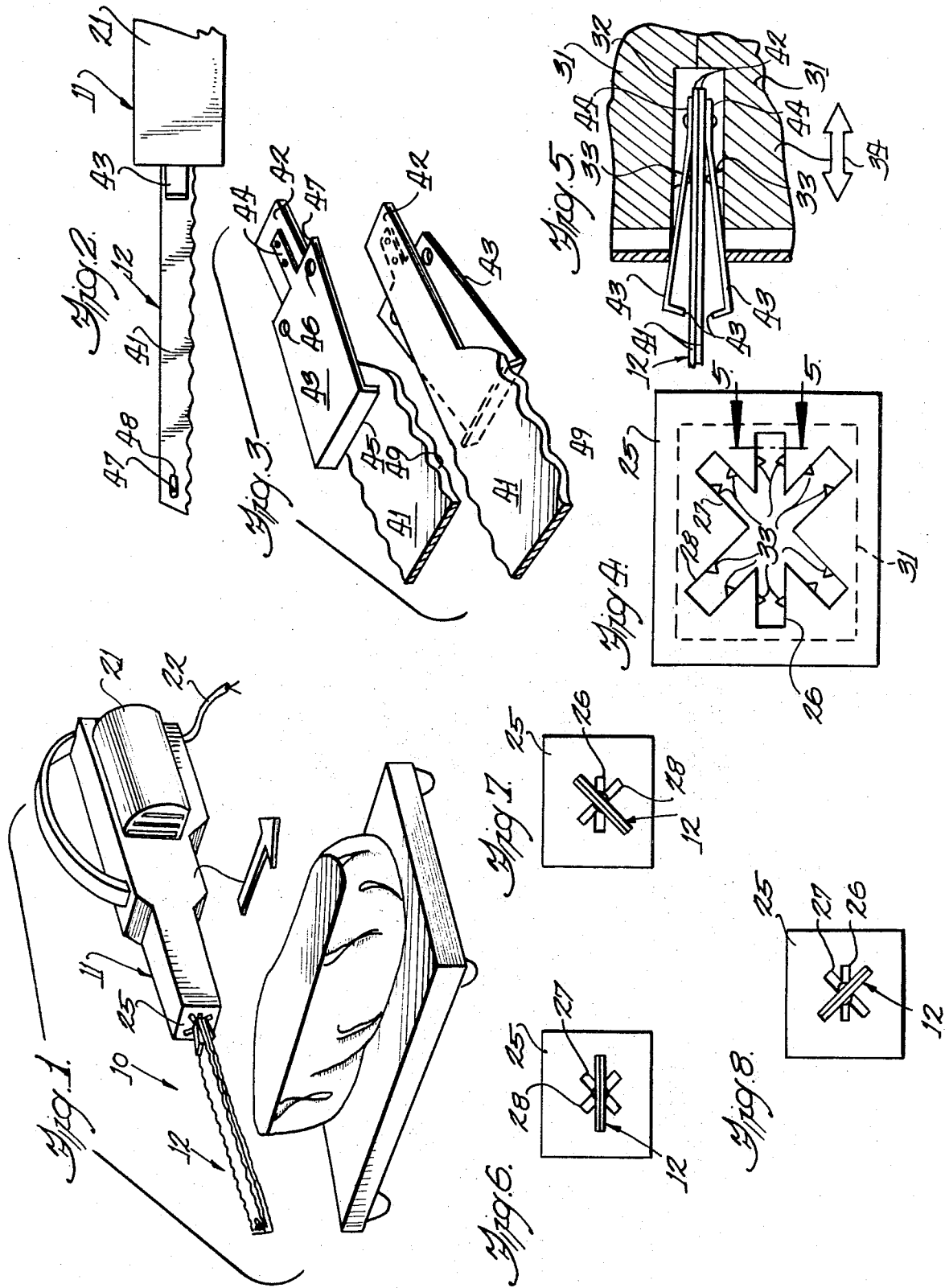

ELECTRIC KNIFE

BACKGROUND OF THE INVENTION

1. Field of the Invention

This invention relates generally to electric knives and more particularly to a novel and improved electric knife wherein the blade is disposed horizontally or at an angle to the motor housing for ease in slicing thin sheets of meat or the like in a horizontal cutting motion of the blade relative to the surface of the food being sliced.

2. Description of the Prior Art

It has been known in the prior art to provide an electric knife of the type having a handle with a motor disposed therein and with a blade projecting outwardly from one end thereof with the blade consisting of a pair of cutting blades disposed in side-by-side relationship and adapted for reciprocating motion relative to each other, such blades being disposed in a vertical plane relative to the motor housing, examples of this type of device being shown in Christensen U.S. Pat. No. 3,307,259; Freeman U.S. Pat. No. 3,308,535; and Chambers U.S. Pat. No. 3,461,556. In each of these devices the blade is mounted vertically with it being exceptionally inconvenient and difficult if it was desired to utilize the device with the blade in the horizontal position as to do so would require a tortuous twisting of a person's wrist to maintain the knife energized and the blades operating, such position preventing a smooth horizontal slicing motion of the meat being sliced.

It is thus presently unfeasible and quite difficult to use presently available electric knives in attempting to slice meat in a horizontal direction in a manner such that long thin slices of meat may be obtained from the food product being sliced.

SUMMARY OF THE INVENTION

The present invention recognizes the deficiencies and disadvantages of presently available electric knives and provides a novel solution thereto in the form of an electric knife wherein the blade is mounted in a horizontal disposition for the horizontal slicing of meats, and further permitting the blade to be disposed at a diagonal to the motor housing should such provide a more desirable manner of working with the knife to an individual in the obtaining of horizontal slices of meat and the like.

It is thus an object of the present invention to provide an electric knife having a horizontally disposed cutting blade for ease in slicing thin sheets of meat, fish, or other food substances from the surface of the food being prepared.

A further object of the present invention is the provision of an electric knife which is easy to use and efficient in operation.

Still further objects, features and advantages of the present invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of an electric knife constructed in accordance with the present invention and illustrated as horizontally slicing a meat product;

FIG. 2 is a fragmentary top plan view of the horizontally disposed cutting blade;

FIG. 3 is a fragmentary exploded perspective view of the terminal end of the cutting blade;

FIG. 4 is an enlarged elevational view of the front end portion of the handle into which the terminal end of the blade is inserted;

FIG. 5 is an enlarged cross-sectional view taken along line 5—5 of FIG. 4;

FIG. 6 is an elevational view of the front end of the handle with the blade disposed horizontally therein;

FIG. 7 is a view similar to FIG. 6 but with the blade disposed at an angle to the handle; and FIG. 8 is a view similar to FIG. 7 except with the blade disposed at a different diagonal angle relative to the handle.

DESCRIPTION OF THE PREFERRED EMBODIMENT

Referring now to the drawings in detail there is illustrated a preferred form of an electric knife constructed in accordance with the principles of the present invention and designated in its entirety by the reference numeral 10 and which is comprised of two component parts, namely a handle member 11 and a cutting blade 12. The handle 11 may be of any suitable design or configuration and includes a housing 21 having a motor (not shown) disposed interiorly thereof and which may be connected to a suitable electric wire 22 for attachment to a suitable source of electrical energy, or alternatively the motor may be powered by self contained batteries. The housing 21 includes a front end 25 which is provided with crossing individual slots including a horizontal slot 26, a diagonal slot 27, and an opposite diagonal slot 28. Disposed behind front end 25 is a reciprocating drive device 31 which is disposed rearwardly of the slots 26–28 and which is provided with a set of slots horizontally aligned with said slots 26–28, such as a slot 32, with such slots having projecting inwardly thereof pairs of spaced apart projections 33 which are adapted for cooperation with cutting blade 12 as will be later described. The reciprocating member 31 is driven by the motor in the handle in a direction toward and away from the front end 25, such reciprocal directions being as generally indicated by arrow 34 in FIG. 5.

The cutting blade 12 comprises a pair of juxtapositioned blade members 41 each being substantially identical to each other and mirror images of each other, each blade member 41 having a terminal elongated rectangularly shaped end 42 with each end 42 having associated therewith a resilient spring member 43 connected to the exterior surface of the blade by a lip 44 which is riveted to the blade in a manner such that the terminal edge 45 of each spring member is spaced outwardly from the exterior surface of the associated blade member 41. Each spring member includes a pair of apertures 46 adjacent a top edge 47 thereof and spaced apart a distance corresponding to the spacing between associated sets of projections 33 in the slots 26–28. The blade members 41 are positioned with their interior surfaces in juxtaposition and secured thereto for relative movement relative to each other by means of a conventional pin and slot arrangement 47 and 48 (FIG. 2) with pin 47 being attached to the interior surface of one of blade members 41 and projecting normal thereto in a manner to engage the slot 48 formed in the opposite blade member. Each blade member 41 is provided with a serrated cutting edge 49 along each side edge thereof.

In operation, the cutting blade 12 is horizontally aligned with horizontal slot 26 and then axially inserted thereinto with spring members 43 being resiliently squeezed together until apertures 46 of spring members 43 are engaged in associated sets of projections 33 such projections effecting the reciprocating movement of the blade members 41 relative to each other under driving action of the reciprocating drive device 31 upon energization of the motor in the handle 11.

Alternatively, as seen in FIGS. 7 and 8, the blade may be inserted at an angle into the diagonal slots 27 and 28 should the same be desired by the user.

There is thus provided a novel electric knife having a blade specifically intended for slicing the surface of a food product in a horizontal direction to provide thin sheets of sliced food product.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. An electric knife including a handle member having a motor therein and a reciprocating device operably attached to the motor for reciprocal driving motion thereby, the reciprocating device disposed adjacent a front end of the handle member, the electric knife comprising: the front end of the handle having a horizontal slot extending therethrough, and a knife member having one end adapted to be inserted through said slot to engage said reciprocating mechanism in a manner to drive the knife member in a reciprocating manner at a horizontal disposition to the handle; the reciprocating device including a horizontal slot disposed at a forward end thereof and immediately rearwardly of the horizontal slot in the front end of the handle, pairs of opposing projections vertically aligned and projecting inwardly of said reciprocator slot and adapted to engage said terminal end of said knife member to effect reciprocating movement thereof; the knife member comprising a pair of juxtapositioned blade members, each blade member being the mirror image of the opposite blade member, each blade member having an interior surface and an exterior surface and a serrated cutting edge along each side edge thereof, said interior surfaces of said blade members being disposed in juxtaposition, a pin member projecting outwardly of the interior surface of one of said blade members and adapted to engage in a sliding and guiding manner an elongated longitudinal slot disposed in the free end of the opposite blade member such that the blade members are guided for reciprocal movement relative to each other, a resilient spring member operatively associated with each terminal end of each blade member, each spring member having an innermost edge with a lip projecting outwardly therefrom and rigidly attached to the exterior surface of the terminal end of said associated blade member, the free outermost edge of each resilient member including a flange portion projecting at an angle to the resilient member in the direction of the associated blade member and spaced outwardly therefrom, and a pair of laterally spaced apart apertures disposed in each resilient member adjacent the innermost edge thereof and adapted to be releasably engaged by said projections in said reciprocating device when said blade members are inserted into the front end slot and associated reciprocating device slot of the electric knife handle; the front end of the handle further comprising a pair of crossing diagonal slots defining a general X-shape, said reciprocating device further including a similar pair of X-shaped slots disposed inwardly of said front end X-shaped slots and further including sets of projecting members projecting inwardly of said reciprocator X-shaped slots whereby the terminal end of the knife blade may be selectively inserted into a diagonal slot in a manner to engage the reciprocating device to effect the reciprocating relative movement of the blade members relative to each other at the angle relative to the handle member.

* * * * *